(12) United States Patent
Braeuer et al.

(10) Patent No.: US 7,165,756 B2
(45) Date of Patent: Jan. 23, 2007

(54) PRESSURE REGULATING VALVE FOR COMMON-RAIL FUEL INJECTION SYSTEM

(75) Inventors: Christian Braeuer, Steyr (AT); Stefan Holl, Dresden (DE)

(73) Assignee: Robert Bosch GmbH, Stuttgart (DE)

( * ) Notice: Subject to any disclaimer, the term of this patent is extended or adjusted under 35 U.S.C. 154(b) by 16 days.

(21) Appl. No.: 10/940,972

(22) Filed: Sep. 15, 2004

(65) Prior Publication Data
US 2005/0056802 A1    Mar. 17, 2005

(30) Foreign Application Priority Data
Sep. 15, 2003    (DE) .............................. 103 42 484

(51) Int. Cl.
*F02M 51/00*    (2006.01)

(52) U.S. Cl. ................................ 251/129.18

(58) Field of Classification Search ............ 251/129.18
See application file for complete search history.

(56) References Cited

U.S. PATENT DOCUMENTS 6,047,948 A * 4/2000 Hasegawa et al. ...... 251/129.18
6,385,848 B1 * 5/2002 D'Arrigo ............... 29/890.129

* cited by examiner

*Primary Examiner*—J. Casimer Jacyna
(74) *Attorney, Agent, or Firm*—Ronald E. Greigg

(57) ABSTRACT

A pressure regulating valve for regulating the pressure in a common rail, having a pistonlike valve member which is axially displaceably guided in a bore and acts on a closing element that can be pressed against a valve seat, and the valve member forms an armature of an electromagnet, to which current can be supplied. The minimal spacing between the armature and the valve housing is adjustable. In this way, the setting of the closing force of the valve can be done in the preassembled state.

6 Claims, 1 Drawing Sheet

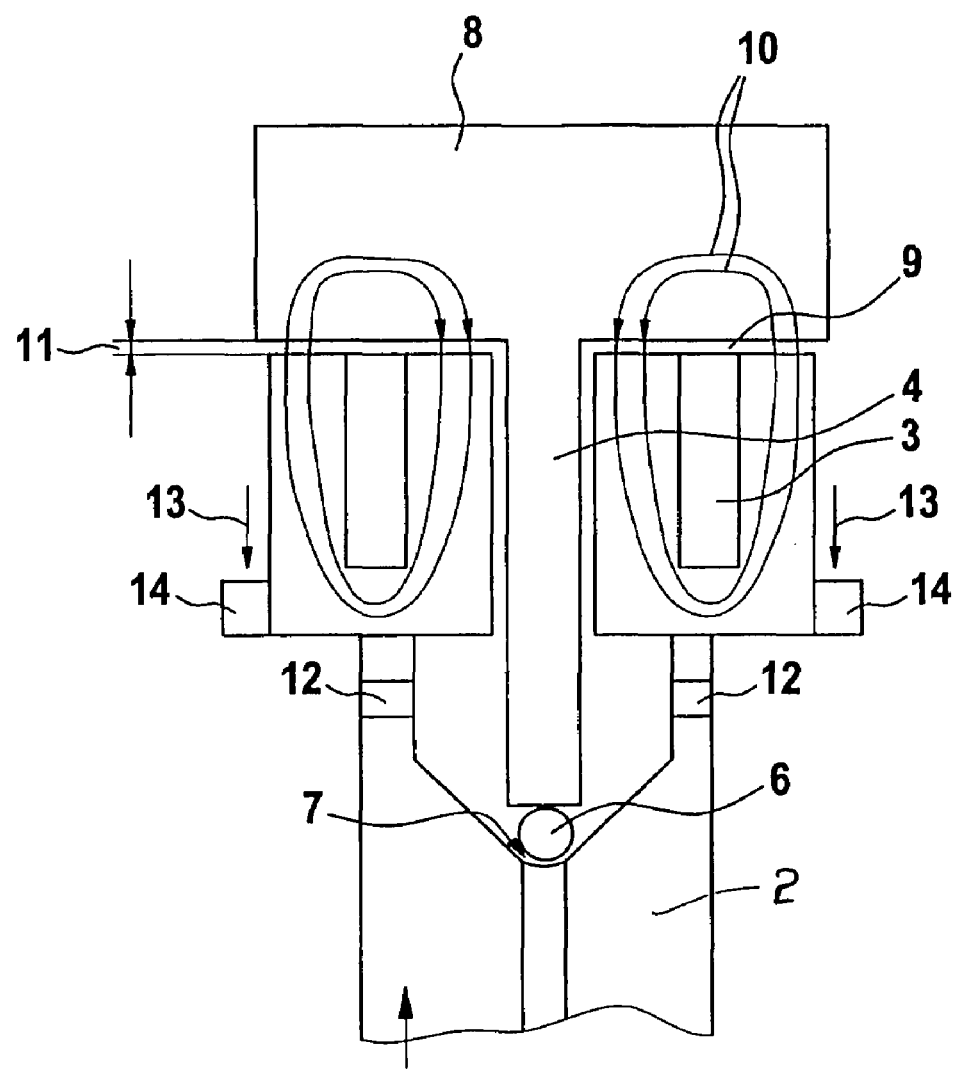

PRESSURE REGULATING VALVE FOR COMMON-RAIL FUEL INJECTION SYSTEM

BACKGROUND OF THE INVENTION

1. Field of the Invention

The invention relates to a pressure regulating valve for a common-rail fuel injection system for internal combustion engines, for regulating the pressure in the common rail and having a pistonlike valve member guided axially displaceably in a bore, which valve member acts on a closing element which can be pressed against a valve seat, and the valve member forms an armature bolt of an electromagnet that can be supplied with current. Electromagnets with movable armatures are furthermore used as actuators in many kinds of applications.

2. Description of the Prior Art

Pressure regulating valves are known in manifold versions, including pressure regulating valves serving to regulate the pressure in a common rail, with which it communicates via an inlet. The pressure regulating valve has a pistonlike valve member, guided axially displaceably in a bore, that can move counter to a force which is exerted on the valve member preferably by the current in the electromagnet. The force acts in the closing direction, so that the valve member presses against a closing element of the pressure regulating valve and is pressed against a valve seat. The valve member forms an armature bolt of an electromagnet, which can be supplied with current for controlling the force.

Supplying current creates a magnetic field, which penetrates the armature of the electromagnet, as a result of which a magnetic force acts on the armature bolt. The valve member presses the closing element against the valve seat with this force. If the force generated by the hydraulic pressure of the fuel exceeds the closing force that is exerted on the closing element via the valve member, the closing element is lifted from the valve seat. In that case, fuel flows out of the common rail through the inlet into a relief chamber via the opened pressure regulating valve.

When a higher pressure is to be established in the common rail, the current in the electromagnet is increased, so that the closing force is increased, and thus the closing element does not lift from the valve seat until a higher pressure is established in the common rail, whereupon fuel can flow out of the common rail into the relief chamber.

If no current is supplied to the electromagnet, the valve member is pressed against the valve seat only by its own weight. Moreover, a mechanical spring can be installed, which with its spring force presses the valve member against the closing element and the valve seat. This force is independent of the current supply to the electromagnet.

Regulating the pressure is done via the setting of the current in the coil of the electromagnet. The actual pressure thus depends on the parameters of the electromagnet. These include not only the electromagnetic parameters but also the geometric dimensions. The air gap between the armature and the fixed housing in which the coil is located is of particular significance. The air gap is defined by the component geometry.

To enable setting the pressure precisely or regulating a precise pressure interval, the components must be adapted precisely to one another. The requisite production tolerances are correspondingly narrow, which means considerable effort and thus expense for assembly.

OBJECT AND SUMMARY OF THE INVENTION

The object of the invention is to refine the pressure regulating valve known from the prior art further in such a way that a precise setting of the closing force of the valve can be done in the preassembled state.

The spacing between the armature and the valve housing is definitive for the penetration of the armature by the magnetic field lines and accordingly for the magnetic force that can be transmitted by the armature and that leads to the closing force of the valve.

The armature of the electromagnet as a rule comprises a covering and an armature bolt, which simultaneously forms the valve member that acts on the closing element. The penetration of the armature by the magnetic flux lines and hence the magnetic force with which the valve member acts depend substantially on the air gap between the armature covering and the valve housing. In particular, the pressure interval to be regulated depends on the minimal spacing between the armature covering and the housing.

In a limit situation, in which this spacing becomes zero, the armature covering rests on the housing, and the pressure can then no longer be regulated at all.

The valve must therefore be designed according to the invention in such a way that the air gap between the armature and the valve housing is adjustable. This can for instance be done by spacers that can be installed at any time.

Advantageously, however, the valve housing is designed such that its length in the longitudinal direction is adjustable. To that end, according to the invention, a desired deformation point is provided, which is located at the weakest point of the housing, namely between the valve seat and the coil winding.

By means of an external force, which is to be applied to the housing, upsetting can take place at the desired deformation point, and by means of it the longitudinal length of the valve housing is reduced while the air gap between the armature covering and the valve housing is enlarged.

This deformation can be done when the pressure regulating valve has already been mounted on the common rail. The pressure regulating valve to be regulated can accordingly be set in the actual operating state and selected as a function of the desired pressure values in a given common rail.

There is no need for presetting of the air gap, which is complicated, to be assured, and components can be combined regardless of the location where they are used. It is also unnecessary to maintain extremely precise production tolerances.

BRIEF DESCRIPTION OF THE DRAWING

The invention will be better understood and further objects and advantages thereof will become more apparent from the ensuing detailed description of a preferred embodiment taken in conjunction with the single drawing figure which shows a section through a schematic illustration of a pressure regulating valve according to the invention.

DESCRIPTION OF THE PREFERRED EMBODIMENT

In FIG. 1, a longitudinal section is shown through a schematic view of a pressure regulating valve 1 which can be disposed on a common rail, not shown in the drawing.

The pressure regulating valve 1 itself has a valve body 2, in which an electromagnet with a coil winding 3 is disposed.

The coil is embedded in soft magnetic material, embodied for instance as transformer sheet metal.

The armature bolt 4 of the electromagnet 3 is located in an axial recess and can be pressed as a valve member against the closing element 6 and the valve seat 7. The armature furthermore has a covering 8, which is spaced apart from the valve housing 2 by an air gap 9.

Supplying current to the electromagnet causes the armature covering 8 and armature bolt 4 to be penetrated by magnetic flux lines 10, resulting in a magnetic force which presses the valve member against the closing element 6 and the valve seat 7.

The magnitude of the force is dependent on the size of the air gap 9, or in other words on the spacing 11 between the armature covering 8 and the valve housing 2.

This spacing 11 can be varied by exerting an external force on the valve housing 2. Between the valve seat 7 and the coil windings 3, desired deformation points 12 are located on the valve housing 2. They are upset when a force exists in the axial direction 13 on a force pickup 14 on the valve housing 2.

As a result of the upsetting of the valve housing 2, the spacing 11 between the valve housing 2 and the armature covering 8 is increased, and the armature is no longer penetrated by the magnetic field lines 10 to the same extent as before. Accordingly, the magnetic force with which the valve member 5 presses against the closing element 6 and the valve seat 7 also varies.

The range of the regulatable closing pressure can accordingly be set when the pressure regulating valve 1 has already been installed on the common rail, not shown in the drawing, or in other words in a preassembled state.

The foregoing relates to a preferred exemplary embodiment of the invention, it being understood that other variants and embodiments thereof are possible within the spirit and scope of the invention, the latter being defined by the appended claims.

We claim:

1. In a pressure regulating valve for a common-rail fuel injection system for internal combustion engines for regulating pressure in the common rail, having a valve housing in which an electromagnet with a coil winding is disposed and a pistonlike valve member guided axially displaceably in a bore of the valve housing, which valve member acts on a closing element which can be pressed against a valve seat of the valve housing, the valve member forming an armature bolt of the electromagnet to which current can be supplied whereby supplying current to the electromagnet causes the valve member to press against the closing element with varying force depending on the spacing between the armature and the valve housing, the improvement wherein a minimal spacing between the armature and valve housing (2) after assembly is adjustable.

2. The pressure regulating valve of claim 1, wherein the longitudinal dimension of the valve housing (2) is adjustable.

3. The pressure regulating valve of claim 1, wherein, between the valve seat (7) and the coil (3), the valve housing (2) has a desired deformation point (12), which can be upset by an axial external force, as a result of which the minimal spacing (11) between the armature and the valve housing (2) increases.

4. The pressure regulating valve of claim 2, wherein, between the valve seat (7) and the coil (3), the valve housing (2) has a desired deformation point (12), which can be upset by an axial external force, as a result of which the minimal spacing (11) between the armature and the valve housing (2) increases.

5. The pressure regulating valve of claim 3, wherein at least one force pickup (14) is mounted on the valve housing (2) and can be acted upon by an external force for the upsetting of the valve housing (2).

6. The pressure regulating valve of claim 4, wherein at least one force pickup (14) is mounted on the valve housing (2) and can be acted upon by an external force for the upsetting of the valve housing (2).

\* \* \* \* \*